(No Model.)

W. STRINGER.
GRAIN REGISTER.

No. 259,942.   Patented June 20, 1882.

Witnesses:
Arthur H. Cook
Walker Waddle

Inventor:
Wesley Stringer
Per Rich. Stephens,
Atty.

UNITED STATES PATENT OFFICE.

WESLEY STRINGER, OF PORT DOVER, ONTARIO, CANADA.

GRAIN-REGISTER.

SPECIFICATION forming part of Letters Patent No. 259,942, dated June 20, 1882.

Application filed September 24, 1881. (No model.) Patented in Canada July 9, 1881.

*To all whom it may concern:*

Be it known that I, WESLEY STRINGER, of the village of Port Dover, in the county of Norfolk, in the Province of Ontario, Dominion of Canada, have invented a new and useful Machine for Registering the Measurement of Grain from Thrashing-Machines or other Sources of Supply, which invention is described and fully set forth in the following specification, reference being had to the accompanying drawings.

My invention consists of a revolving triple platform, B B B, bearing a hollow vertical revolving shaft, F. This platform rests and revolves upon a tripod, A. Rising from the center of this tripod is a stationary vertical shaft, J, which passes longitudinally through the hollow shaft F and supports the dial-box R. The base of this platform consists of a wave-ring, C, resting on anti-friction wheels D D D, attached to each leg of the tripod. The platform, with its shaft F, revolves about the shaft J in such a manner that each wing of the platform containing one of the measures Q is brought by one-third of a revolution immediately under the spout, where grain is delivered from a thrashing-machine or other source of supply. As a measure is filled the platform is turned by the attendant one-third of a revolution, and the next wing bearing another measure is moved under the spout of delivery. The horizontal eccentricity of the wave-ring causes it to rise and fall vertically while passing over the anti-friction wheels at each third of a revolution, and with it the platform B and shaft F, during which the next wing is moved into position, and this vertical motion is communicated by the shaft F to the sliding collar I and pawl L and registered on the dial-plates O O.

Figure 2:
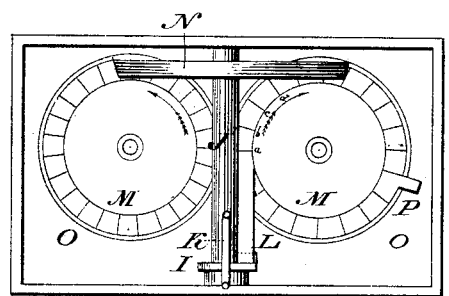

The registering apparatus consists of the dial-plates O O, the right-hand plate graduated to register from one to twenty measures, and the left-hand plate graduated to register from twenty to five hundred. The backs of the dial-plates are ratcheted to correspond with the figures on their faces. Figure 2 shows the backs of the dial-plates as though each part were separately reversed. As the wave-ring revolves with the platform B B and vertical revolving shaft F, the collar I, bearing the pawl L, is pushed up, forcing the pawl against a ratchet-tooth, $a$, of the right-hand dial-plate, turning the dial-plate from left to right one division and causing the tooth $a$ to take the place of $b$, $b$ of $c$, &c. This movement is secured and prevented from returning by the click-spring N. The click-spring N is secured by its center to the rear of dial-box, and its right and left ends respectively engage a ratchet-tooth on the right and left hand dial-plates. When the right-hand dial-plate, starting from zero, (0,) has made a complete revolution, the pin P (corresponding to figure 10 on the right-hand dial-plate) locks into a ratchet-tooth on the left-hand plate and moves one division thereon, registering twenty measures. The right-hand plate then starts again from 0, as before. The platform may be turned from left to right, or vice versa. The registration will be continuous up to five hundred measures, thus preventing the possibility of errors or fraud. The dial-plates are set by means of the pins or handles S S. The front of the dial-box is protected by a glass door, which may be locked. The lock is shown by the escutcheon E.

Figure 1:
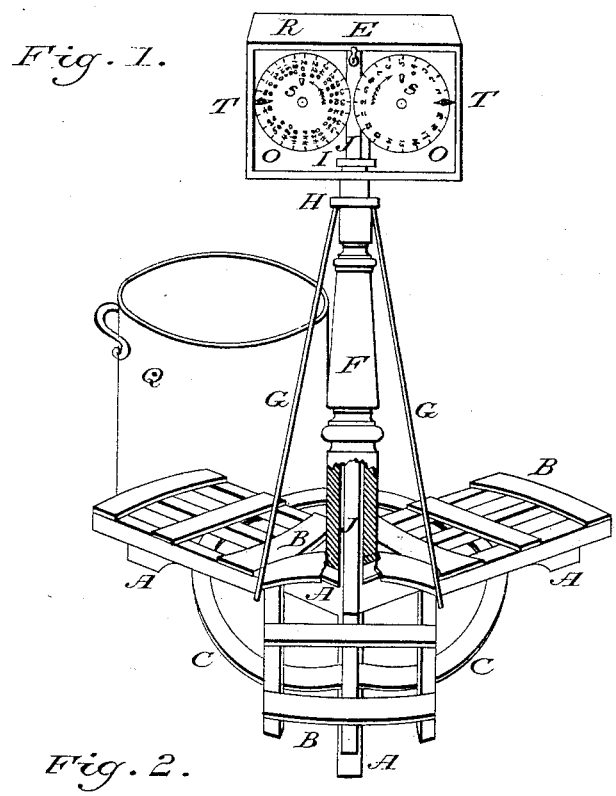
Figure 3:
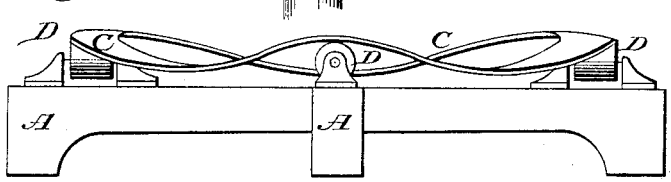

Fig. 1 is a perspective view of the machine. Fig. 2 is a back view of dial-plates. Fig. 3 is a vertical elevation of the wave-ring.

A A is a stand or tripod supporting the machine; B B B, a triple revolving platform bearing the measures Q; C, a wave-ring attached to the base of platform. D D D are anti-friction wheels attached to the legs of tripod, on which the wave-ring revolves; E, an escutcheon covering the lock of dial-box. F is a vertical hollow shaft, attached to the platform and revolving with it; G G G, stays or braces, with their upper ends attached to the shaft F at the collar H and their lower ends anchored to the platform; J, a vertical stationary shaft anchored to the tripod, its lower part inclosed by the shaft F, which is bored out to receive it, and through which it passes longitudinally. The upper end of J supports the dial-box.

I is a collar resting on the upper disk of F, through which it obtains a vertical sliding motion on the shaft J. It is prevented from revolving by a groove which plays against the guide K. This collar I carries the pawl L, which moves the dial-plates by working against the ratchet-teeth M M. N is a click-spring which secures these movements and prevents the dial-plates from turning backward. M M a b c d are ratchet-teeth on the backs of dial-plates, corresponding to the figures on their faces; P, a pin on the back of the right-hand dial, corresponding to figure 10 on its face, which gears into a tooth of the left dial at each revolution of P and moves the left dial one division. Q Q Q are measures, of which there are three, and may be bushels or any other measure of quantity in use. R is the dial-box, with a glass door covering the dial-plates. S S are handles to set the dials; T T, indicators pointing to the numbers of measures registered.

The machine is set by turning the right-hand dial-plate from left to right and the left-hand dial-plate from right to left until the indicators point to zero.

I claim as my invention—

The combination of the horizontally-eccentric wave-ring or cam, revolving on anti-friction wheels, with the triple platform B B B, and hollow vertical revolving shaft F, and vertical stationary shaft J, and slide-collar I, and pawl L, in combination with the dial-plates O O, graduated on their faces and ratcheted on their backs and secured by the click-spring N, substantially as and for the purpose hereinbefore set forth.

WESLEY STRINGER.

Witnesses:
 RICH. STEPHENS,
 MINNIE SILVERTHORN.